United States Patent [19]
Khanh

[11] Patent Number: 5,394,040
[45] Date of Patent: Feb. 28, 1995

[54] ELECTRIC MOTOR HAVING INTERNAL HEAT DISSIPATOR

[75] Inventor: Dinh Khanh, Gainsville, Fla.

[73] Assignee: Heat Pipe Technology, Inc., Alachua, Fla.

[21] Appl. No.: 118,471

[22] Filed: Sep. 7, 1993

[51] Int. Cl.⁶ .......................... H02K 1/32; H02K 9/06
[52] U.S. Cl. ........................................ 310/64; 310/54; 310/62
[58] Field of Search ...................... 310/54, 61, 64, 62, 310/63, 88; 415/90

[56] References Cited

U.S. PATENT DOCUMENTS

| | | | |
|---|---|---|---|
| 1,739,137 | 12/1929 | Gay | 310/54 |
| 2,327,786 | 8/1943 | Heintz | 310/54 |
| 2,632,598 | 3/1953 | Wales, Jr. | 230/129 |
| 3,017,848 | 1/1962 | Bishop | 115/16 |
| 3,094,273 | 6/1963 | Hull et al. | 230/211 |
| 3,275,223 | 9/1966 | Fowell | 415/90 |
| 3,842,596 | 10/1974 | Gray | 60/39.66 |
| 3,866,668 | 2/1975 | Doerner | 165/1 |
| 3,914,625 | 10/1975 | Lloyd et al. | 310/64 |
| 4,036,584 | 7/1977 | Glass | 415/90 |
| 4,137,472 | 1/1979 | Workman | 310/61 |
| 4,240,000 | 12/1980 | Harano et al. | 310/54 |
| 4,322,646 | 3/1982 | Persson | 310/64 |
| 4,406,959 | 9/1983 | Harano et al. | 310/61 |
| 4,869,644 | 9/1989 | Takigawa | 416/235 |
| 5,073,736 | 12/1991 | Gschwender et al. | 310/88 |
| 5,192,183 | 3/1993 | Wilkinson | 415/90 |
| 5,209,644 | 5/1993 | Dorman | 416/235 |
| 5,283,488 | 2/1994 | Ponnappan et al. | 310/54 |

FOREIGN PATENT DOCUMENTS

| | | | |
|---|---|---|---|
| 452393 | 5/1930 | France. | |
| 63549 | 5/1980 | Japan | 310/64 |
| 109796 | 8/1980 | Japan | 415/90 |
| 199524 | 2/1993 | Taiwan, Prov. of China. | |
| 985444 | 12/1882 | U.S.S.R. | 415/90 |

*Primary Examiner*—Steven L. Stephan
*Assistant Examiner*—Clayton E. LaBalle
*Attorney, Agent, or Firm*—Nilles & Nilles

[57] ABSTRACT

A heat dissipator for an electric motor includes an impeller having an internal heat transfer mechanism. The heat transfer mechanism provides efficient heat transfer from the motor armature to the surrounding environment without forcing cooling fluids into the motor and without transferring heat through the motor housing. The motor can therefore be encased in sealed, lightweight plastic motor housing having relatively poor heat transfer characteristics without danger of overheating. The impeller is preferably designed to displace fluids without turbulence, thereby reducing noise and increasing efficiency. To this end, the impeller employs annular disks stacked on a shaft which may be rotatably mounted in a specially shaped housing and which preferably is formed from an extension of the motor drive shaft. The disks and a complementary surface cooperate so as to use a combination of surface friction, centrifugal forces, and a venturi effect to propel fluids without turbulence. This type of impeller is also preferred because it is sufficiently compact to be attachable to a conventional motor without prohibitively increasing the size of the overall system.

14 Claims, 2 Drawing Sheets

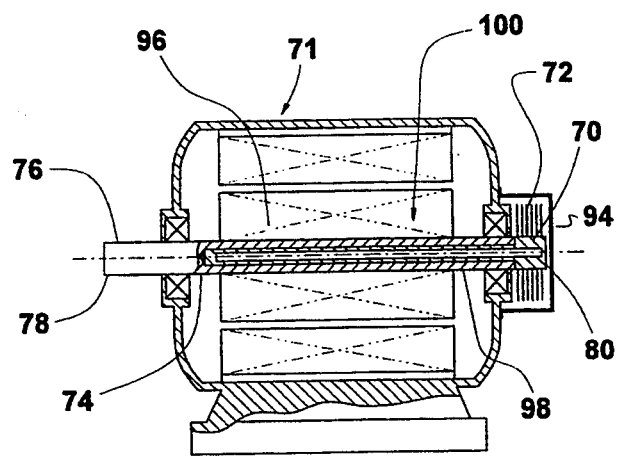
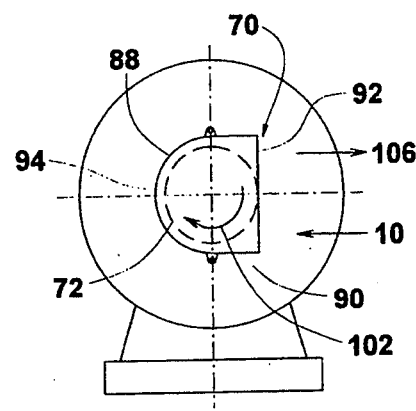
FIG. 3              FIG. 4
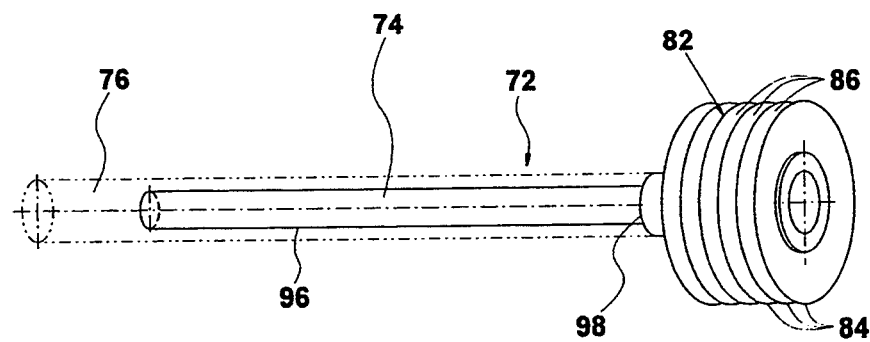
FIG. 5

ELECTRIC MOTOR HAVING INTERNAL HEAT DISSIPATOR

BACKGROUND OF THE INVENTION

1. Field of the Invention

The invention relates to electric motors and, more particularly, relates to electric motors having internal heat transfer mechanisms.

2. Discussion of the Related Art

Electric motors are well known for providing a central rotating shaft which can supply a rotational force to a system. Such motors generate substantial heat which must be dissipated to prevent the motors from overheating.

Two heat dissipation techniques are commonly employed, each of which exhibits several drawbacks and disadvantages. The first technique utilizes an internal fan to draw cooling air through the motor armature. This technique, while providing adequate cooling, suffers the disadvantage of drawing dust and other particulates into the motor which may harm the motor. The second technique employs an external fan to draw cooling air past the exterior of a sealed motor housing, thus providing indirect cooling. This technique is relatively inefficient because the point of heat transfer is remote from the point at which heat is generated. To compensate for this inefficiency, relatively large fans must be employed along with metal housings promoting heat transfer, thus increasing the weight and complexity of the motor.

Moreover, both of these methods suffer the disadvantage of requiring blades which are inherently noisy and inefficient. Fan blades operate by colliding with the fluid being displaced and by pushing the fluid to displace it. This type of operation creates turbulence within the fan or blower which not only creates unpleasant noise, but which also impedes the movement of the fluid through the device and reduces the overall efficiency of the device.

OBJECTS AND SUMMARY OF THE INVENTION

It is therefore an object of the invention to provide an internal heat dissipator for an electric motor or the like which efficiently dissipates heat without drawing dust or other contaminants into the motor.

In accordance with a first aspect of the invention, this object is achieved by providing a heat dissipator comprising a rotary shaft which is driven by the motor and which has a first portion in thermal communication with the interior of the motor and a second portion in thermal communication with a cooling fluid, the second portion being sealed from the first portion, a rotor which is mounted on the second portion of the shaft to form an impeller, and a heat transfer mechanism, provided on the shaft, for dissipating heat from the motor to the cooling fluid under the control of the impeller. Preferably, the heat transfer mechanism comprises a heat pipe having an evaporator portion positioned in the first portion of the shaft and a condenser portion at least partially positioned in the second portion of the shaft.

Another object of the invention is to provide an internal heat dissipator for an electric motor or the like which is very quiet.

In accordance with another aspect of the invention, this object is achieved by providing a heat dissipator of the type described above, in which the impeller comprises a plurality of flat annular disks fixedly mounted on the shaft and spaced axially along the shaft with gaps formed therebetween. Preferably, the impeller further comprises a member presenting a complementary surface which is positioned adjacent the rotor to define a gap therebetween which forms the throat of a venturi when the shaft is rotated. The member preferably comprises a housing in which the shaft is mounted and which includes an inlet, an outlet, a suction zone positioned adjacent the inlet, a discharge zone positioned adjacent the outlet, and an intermediate zone positioned between the suction and discharge zones and presenting the complementary surface.

Another object of the invention is provide a motor having an internal heat dissipator.

In accordance with another aspect of the invention, this object is achieved by providing and apparatus including an electric motor including a motor housing and an internal armature, and a rotary shaft which is driven by the motor and which has a first portion in thermal communication with the armature and a second portion in thermal communication with a cooling fluid. A rotor which mounted on the second portion of the shaft to form an impeller, and a heat transfer mechanism is provided on the shaft for dissipating heat from the motor to the cooling fluid under the control of the impeller.

Preferably, the shaft is hollow and the heat transfer mechanism comprises a heat pipe provided in the hollow shaft. The heat pipe includes an evaporator portion for thermal communication with the armature, and a condenser portion for thermal communication with the cooling fluid. The impeller preferably comprises a plurality of flat annular disks fixedly mounted on the shaft and spaced axially along the shaft with gaps formed therebetween.

Preferably, the housing is sealed and made of plastic.

Still another object of the invention is to provide a method of efficiently dissipating heat in an electric motor or the like so that certain internal components could be made of materials other than metal.

In accordance with yet another aspect of the invention, the method comprises (A) transferring heat from the armature to a heat transfer mechanism having a first portion disposed in the motor in thermal communication with the armature and a second portion extending out of the housing, and then (B) transferring heat from the second portion of the heat transfer mechanism to a cooling fluid located outside of the housing.

Preferably, the heat transfer mechanism comprises a heat pipe located in a shaft extending out of the housing, and wherein the step (A) comprises transferring heat from the armature to an evaporator portion of the heat pipe forming the first portion of the heat transfer mechanism, and the step (B) comprises transferring heat from a condenser portion of the heat pipe, forming the second portion of the heat transfer mechanism, to the cooling fluid. The second portion of the heat transfer mechanism is provided in the rotor of a bladeless impeller, and the step (B) comprises propelling the cooling fluid without turbulence by rotating the rotor which draws the fluid through a space formed between the rotor and a complementary surface positioned adjacent the rotor using a combination of frictional forces, venturi effect, and centrifugal forces. The step (B) further comprises transferring heat from the second portion of the heat transfer mechanism to the cooling fluid during the propelling step.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications within the scope of the present invention may be made without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 3 is a schematic sectional elevation view of an electric motor having a heat dissipator in accordance with the preferred embodiment of the present invention;

FIG. 4 is an end view of the motor of FIG. 3; and

FIG. 5 is a perspective view of the rotor of the impeller of the heat dissipator of FIGS. 2 and 3.

DETAILED DESCRIPTION OF THE PREFERRED EMBODIMENTS RESUME

Pursuant to the invention, a heat dissipator for an electric motor is provided which includes an impeller having an internal heat transfer mechanism. The heat transfer mechanism provides efficient heat transfer from the motor armature to the surrounding environment without forcing cooling fluids into the motor and minimizing the transfer of heat through the motor housing. The motor can therefore be encased in sealed, lightweight plastic motor housing having relatively poor heat transfer characteristics without danger of overheating. The impeller is preferably designed to displace fluids without turbulence, thereby reducing noise and increasing efficiency. To this end, the impeller employs annular disks stacked on a shaft which may be rotatably mounted in a specially shaped housing and which preferably is formed from an extension of the motor drive shaft. The disks and a complementary surface cooperate so as to use a combination of surface friction, centrifugal forces, and a venturi effect to propel fluids without turbulence. This type of impeller is also preferred because it is sufficiently compact to be attachable to a conventional motor without prohibitively increasing the size of the overall system.

Structure and Operation of Heat Dissipator

Figure 1:
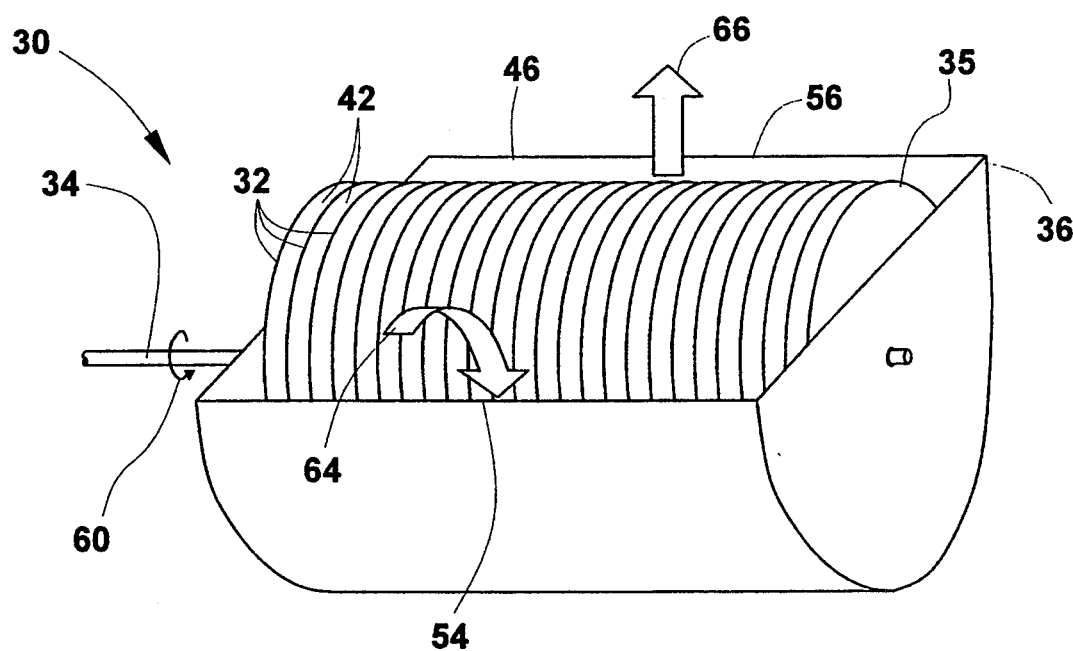
FIG. 1 is a perspective view of a bladeless impeller usable with the heat dissipator of the present invention.
Figure 2:
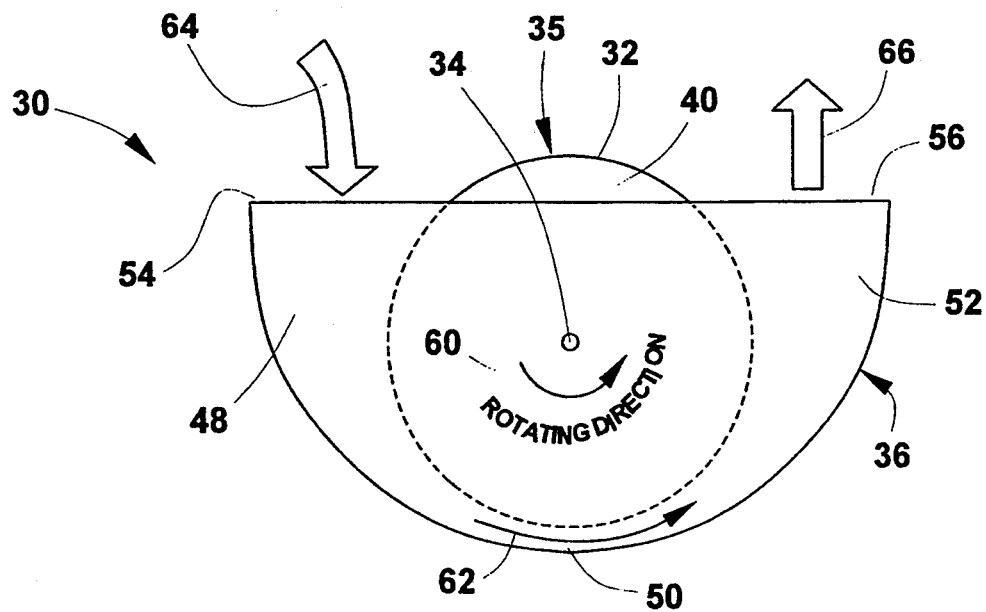
FIG. 2 is an end view of the bladeless impeller of FIG. 1.

The construction and operation of the inventive heat dissipator may become more clear from an understanding of the preferred impeller, which is well suited for receiving an internal heat transfer mechanism forming the core of the inventive heat exchanger. Referring now to FIGS. 1 and 2, a bladeless impeller 30 usable with the inventive heat dissipator includes a rotor 35 mounted in a housing 36 and driven by a motor (not shown). Impeller 30 could be used to displace any liquid or gaseous fluid, but is particularly well adapted to displace air or a similar gas.

Rotor 35 includes a plurality of thin, flat annular disks 32 spaced axially along a shaft 34 and fixedly mounted on the shaft. "Fixedly" as used herein does not require that the disks 32 be nondetachably or even immovably connected to the shaft, but only that the disks rotate with the shaft. Shaft 34 is rotatably mounted on housing 36 and has a distal end which extends from the housing and is coupled to the motor (not shown).

The disks 32 are very thin and have adjacent flat surfaces 40 defining gaps 42 therebetween. Disks 32 could be constructed from any suitable material and, if used in a heat transfer system of the type described below, should be made of aluminum or another suitable material having a high coefficient of thermal transfer. The diameter of the disks 32, as well as the thickness of the gaps 42, should be dimensioned so as to maximize performance of the impeller 30 without creating turbulence. Disks 32 could also be roughened or formed from a high-friction material to increase surface friction between the disks and the fluid being displaced by the impeller or to increase heat transfer if used on a heat pipe.

Housing 36, though generally semi-cylindrical, is specially shaped and oriented with respect to the rotor 35 so as to define a volute having consecutive zones 48, 50, and 52 between the edges 44 of the disks 32 and the inner periphery 46 of the housing 36. Zone 48 constitutes a suction zone extending from an inlet 54 of the housing 36 to the second zone 50 and decreasing in diameter from the inlet 54 towards the zone 50. Zone 48 is subject to sub-ambient pressures during operation of the impeller 30 for reasons discussed below and thus draws fluid into the impeller. Intermediate zone 50 is narrower than either of zones 48 and 52, extends less than the full circumferential length of the volute, and presents a complementary surface defining a gap which in use forms the throat of a venture-like element causing a pressure drop and creating the suction in zone 48. Because the axes of the rotor 35 and the housing 36 are offset (as clearly illustrated in the drawings), the gap has a minimum thickness extending generally along a plane which is perpendicular to the page in FIG. 4). Discharge zone 52 presents a surface area which increases fairly rapidly from zone 50 to an outlet 56 of the housing 36. This increasing surface area facilitates non-turbulent fluid flow out of the housing 36 during operation of the impeller 30.

The operation of impeller 30 will now be described, displacing air as an exemplary fluid. Operation of the impeller is initiated by energizing the motor (not shown) to rotate the shaft 34 in the direction of arrows 60, thus rotating the disks 32 within the housing 36. Surface friction between the side surfaces 40 of the disks and the air entrain the air to move with the disks 32 in the direction of arrows 60. The annular disks 32 centrifugally accelerate the air in a curved trajectory so that it is projected to the perimeter of the disks 32 as it moves through suction zone 48 and into the narrowed area or gap 50 to form a stream 62. There, the velocity of the air increases and causes a pressure drop, creating sub-ambient or sub-atmospheric pressure in zone 48 that draws more air into the inlet 54 of housing 36 as represented by the arrow 64. The air then exits the intermediate zone 50 and flows tangentially through the discharge zone 52 and out of the outlet 56 of the housing 36 in the direction of arrow 66 without turbulence. This lack of turbulence results in essentially noiseless operation of the impeller 30 which not only is acoustically pleasing but which also increases the overall efficiency of the system.

The impeller 30 need not be encased in the specially designed housing 36 and, in fact, need not be encased in a housing at all so long as it is positioned adjacent an element presenting a complementary surface to the disks to define a space in which a venturi is formed upon operation of the impeller. Such an element could include a flat or curved surface, or even another impeller.

Referring now to FIGS. 3–5, the inventive heat dissipator 70 is designed to dissipate heat from an electric motor 71. Dissipator 70 comprises an impeller 72 having an internal heat transfer device 74 provided in a hollow shaft 76. Shaft 76 also preferably serves as the primary shaft for motor 71 and has front and rear end portions 78 and 80 and extending fore and aft of the motor 71 and supporting a drive pulley (not shown) and forming the drive shaft of a rotor 82 of the impeller 72, respectively.

Impeller 72 preferably comprises a bladeless impeller of the type described above and thus has a rotor 82 formed from stacked thin, flat disks 84 fixedly mounted to the shaft 76 with gaps 86 formed therebetween. Rotor 82 is mounted in a specially shaped housing 88 of the type described above and having suction and discharge zones 90 and 92 and flanking an intermediate zone 94 presenting the complementary surface for the rotor 82 which defines the gap forming the throat of a venturi-like.

Heat transfer device 74 preferably comprises a heat pipe having an evaporator or cooling portion 96 and a condenser or dissipating portion 98. Heat pipe 74 could be provided in an insert disposed in the shaft 76 or could be formed from the hollow shaft. As is known in the art, heating of the evaporator portion 96 of a heat pipe 74 by thermal contact with a relatively warm environment vaporizes the liquid refrigerant (not shown) disposed therein to form vaporized refrigerant (not shown). Vaporized refrigerant moves into the condenser portion 98 of heat pipe 74, where it is cooled by a relatively cool environment surrounding the condenser portion 98. Condensation can be facilitated by providing an internal wick or grooves (not shown) on the internal surface of the heat pipe to increase the heat transfer efficiency.

In the present case, the evaporator portion 96 of heat pipe 74 is disposed within the shaft 76 of the motor 71, and the condenser portion 98 of shaft 76 supports the disks 84 and is positioned outside of the motor 71 and thus is sealed from the interior of the motor 71.

In use, heat is generated by the armature 100 of motor 71 when the motor 71 is energized to drive shaft 76 to rotate in the direction of arrow 102. Rotation of shaft 76 transmits output torque to the pulley or the like (not shown) while simultaneously driving the impeller 72 to draw air or another fluid through housing 88 in the direction of arrows 104 and 106. Liquid refrigerant in the evaporator portion 96 of heat pipe 74 receives heat from the armature 100 and is vaporized, thus removing heat from the armature 100. The vaporized refrigerant flows into the condenser portion 98 of heat pipe 74, where it is cooled by air or another fluid flowing through the housing 88 in the direction of arrows 104 and 106 and recondenses, thus dissipating the heat from the armature 100 to the air or other fluid flowing through the impeller 72. The condensed refrigerant flows back down into the evaporator portion 96 of heat pipe 74, and the process is repeated.

It can thus be seen that the dissipator 70 provides much more efficient heat dissipation than can be achieved with heat dissipators employing external fans. The motor 71 can therefore be encased in a lightweight plastic housing having relatively poor heat transfer characteristics without danger of overheating. Moreover, because the dissipator 70 is sealed to the motor 71 and does not draw air and the accompanying potential harmful dust particles through the motor 71, the chances of motor failure are substantially reduced.

Many changes and modifications could be made to the present invention without departing from the spirit and scope thereof. For instance, the internal heat transfer mechanism need not be formed from a heat pipe, and the disclosed impeller could take any number of forms or even could be eliminated, so long as the heat transfer mechanism provides adequate motor cooling. Other changes and modifications will become apparent from a reading of the appended claims.

I claim:

1. A heat dissipator for an electric motor, said heat dissipator comprising:

A. a rotary shaft which is driven by said motor and which has a first portion in thermal communication with the interior of said motor and a second portion in thermal communication with a cooling fluid;

B. a rotor which is mounted on said second portion of said shaft to form an impeller, said impeller including (1) a plurality of flat annular disks which are fixedly mounted on said shaft and which entrain said cooling fluid by friction upon rotation of said shaft and propel said cooling fluid generally transversely through said rotor, and (2) a volute which encases said rotor and which has a radial inlet and a radial outlet, wherein said volute presents a gap which is formed adjacent an outer radial surface of said rotor, said gap (A) extending less than the full circumferential length of said volute, (B) having a radial distance which is less than the radial distances between the rotor and the remainder of said volute, and (C) having a minimum width occurring generally along a single axial plane of said volute, wherein, when said shaft is rotated, cooling fluid flow through said gap forms a sub-ambient pressure zone the reduced fluid pressure of which draws said cooling fluid generally towards said gap, thereby enhancing operation of said rotor; and C. a heat transfer mechanism, provided on said shaft, for dissipating heat from said motor to said cooling fluid under the control of said impeller.

2. A heat dissipator as defined by claim 1, wherein said heat transfer mechanism comprises a heat pipe having an evaporator portion positioned in said first portion of said shaft and a condenser portion protruding outside and supporting the disks of the rotor.

3. A heat dissipator as defined in claim 1, wherein said disks are spaced axially along said shaft with gaps formed therebetween.

4. A heat dissipator as defined in claim 1, wherein said volute is formed from a housing in which said shaft is mounted and which includes (1) said inlet, (2) said outlet, (3) a suction zone positioned adjacent said inlet, (4) a discharge zone positioned adjacent said outlet, and (5) an intermediate zone positioned between said suction and discharge zones and in which is located said gap.

5. A heat dissipator as defined in claim 4, wherein (1) said suction zone decreases in diameter from said inlet towards said intermediate zone, and (2) said discharge zone increases in diameter from said intermediate zone towards said outlet.

6. An apparatus comprising:

A. an electric motor including a motor housing and an internal armature;

B. a rotary shaft which is driven by said motor and which has a first portion in thermal communication with said armature and a second portion in thermal communication with a cooling fluid;

C. a rotor which is mounted on said second portion of said shaft to form an impeller, said impeller including (1) a plurality of flat annular disks which are fixedly mounted on said shaft and which entrain said cooling fluid by friction upon rotation of said shaft and propel said cooling fluid generally transversely through said rotor, and (2) a volute which encases said rotor and which has a radial inlet and a radial outlet, wherein said volute presents a gap which is formed adjacent an outer radial surface of said rotor, said gap (A) extending less than the full circumferential length of said volute, (B) having a radial distance which is less than the radial distances between the rotor and the remainder of said volute, and (C) having a minimum width occurring generally along a single axial plane of said volute, wherein, when said shaft is rotated, cooling fluid flow through said gap forms a sub-ambient pressure zone the reduced fluid pressure of which draws said cooling fluid generally towards said gap, thereby enhancing operation of said rotor; and D. a heat transfer mechanism, provided on said shaft, for dissipating heat from said motor to said cooling fluid under the control of said impeller.

7. An apparatus as defined in claim 6, wherein (1) said shaft is hollow, and (2) said heat transfer mechanism comprises a heat pipe formed in said hollow shaft and having (A) an evaporator portion for thermal communication with said armature, (B) a condenser portion for thermal communication with said cooling fluid.

8. A heat transfer system as defined in claim 6, wherein said disks are spaced axially along said shaft with gaps formed therebetween.

9. A heat transfer system as defined in claim 8, wherein said volute is formed from a housing on which is rotatably mounted said shaft and which includes (1) said inlet, (2) said outlet, (3) a suction zone positioned adjacent said inlet, (4) a discharge zone positioned adjacent said outlet; and (5) an intermediate zone positioned between said suction and discharge zones and in which is located said gap.

10. An apparatus as defined in claim 6, wherein said shaft is formed from an extension of a motor drive shaft.

11. An apparatus as defined in claim 6, wherein said motor housing is sealed and is made of plastic.

12. A method of dissipating heat from an electrical motor having an armature encased in a housing, said method including:

A. transferring heat from said armature to a heat transfer mechanism having a first portion disposed in said motor in thermal communication with said armature and a second portion extending out of said housing; and then B. transferring heat from said second portion of said heat transfer mechanism to a cooling fluid located outside of said housing, said step (B) including propelling said cooling fluid generally transversely without turbulence through a volute of an impeller by rotating a flat disk rotor to draw said cooling fluid into a radial inlet of said impeller, through a gap and out of a radial outlet of said impeller, thereby enhancing heat transfer, said gap (1) being formed adjacent an outer radial surface of said rotor, (2) extending less than the full circumferential length of said volute, (3) having a radial distance which is less than the radial distances between the rotor and the remainder of said volute, and (4) having a minimum width occurring generally along a single axial plane of said volute, said propelling step using a combination of frictional forces produced by friction between flat disks of said rotor and said cooling fluid, a pressure drop produced by cooling fluid flow through said gap, and centrifugal forces produced by rotation of said disks.

13. A method as defined in claim 12, wherein said heat transfer mechanism comprises a heat pipe located in a shaft protruding outside of said housing, and wherein said step (A) comprises transferring heat from said armature to an evaporator portion of said heat pipe forming said first portion of said heat transfer mechanism, and said step (B) comprises transferring heat from a condenser portion of said heat pipe, forming said second portion of said heat transfer mechanism, to said cooling fluid.

14. A method as defined in claim 12, wherein said second portion of said heat transfer mechanism is located in said rotor.

* * * * *